F. G. HIRST.
SOLDER NIPPLE.
APPLICATION FILED JUNE 23, 1915.

1,173,718.

Patented Feb. 29, 1916.

WITNESSES

INVENTOR
Franklin G. Hirst.
BY Wiedersheim & Fairbanks
ATTORNEYS

UNITED STATES PATENT OFFICE.

FRANKLIN G. HIRST, OF PHILADELPHIA, PENNSYLVANIA, ASSIGNOR TO FRANKLIN BRASS MANUFACTURING COMPANY, OF PHILADELPHIA, PENNSYLVANIA, A CORPORATION OF PENNSYLVANIA.

SOLDER-NIPPLE.

1,173,718.     Specification of Letters Patent.     Patented Feb. 29, 1916.

Application filed June 23, 1915. Serial No. 35,739.

*To all whom it may concern:*

Be it known that I, FRANKLIN G. HIRST, a citizen of the United States, residing at Philadelphia, county of Philadelphia, State of Pennsylvania, have invented a new and useful Solder-Nipple, of which the following is a specification.

My invention relates to a new and useful solder nipple for the connection of two pipes and consists in providing one end with an interior taper or bevel and an exterior taper or bevel, by means of which it is adapted for connection with a pipe in a suitable manner depending upon the flow of the fluid.

For the purpose of illustrating my invention, I have shown in the accompanying drawing one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1:
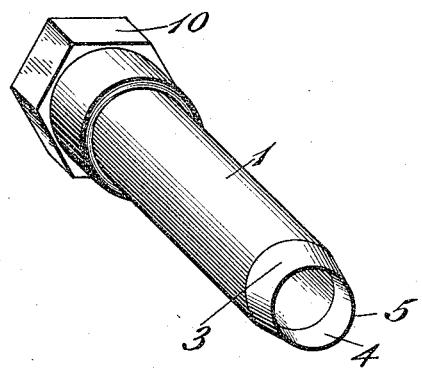
Figure 2:
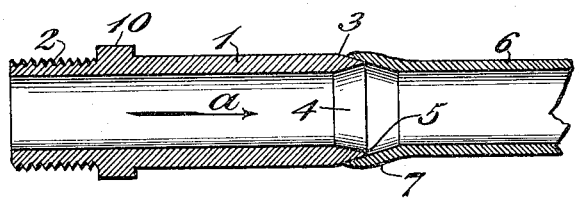
Figure 3:
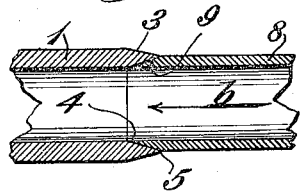

Figure 1 is a perspective view of a nipple embodying my invention. Fig. 2 is a sectional view, showing a nipple with a portion of a pipe connected with the exterior bevel thereof. Fig. 3 is a sectional view showing a portion of a nipple with a portion of a pipe connected with the interior bevel thereof.

Heretofore, in solder nipples which are for connection with a pipe by a wipe solder joint, wherein the end of the nipple is not tapered, it has required a considerable amount of time to prepare the nipple for its connection with the pipe. By my connection, the nipple is adapted for either internal or external connection with a pipe depending upon the direction of flow of the fluid, such as water, and will provide a free fluid passage therethrough. To this end, 1 designates the body of the nipple, which is of suitable size and length and one end of which is provided with screw threads 2, for connection with one pipe. In Fig. 1 the screws 2 are on the interior of the end of the body and in Fig. 2 on the exterior, either form may be employed. At the opposite end, I form an external beveled or tapered face 3 and an internal beveled or tapered face 4, the bevels or faces diverging from the end to form a relatively thin edge which is located approximately in the median line of the wall of the body. By reason of this construction, this end of the nipple can be properly connected with the other pipe in a suitable manner depending upon the direction of flow of the water. Thus, in Fig. 2, if the water is flowing in the direction of the arrow *a*, the end of the lead pipe 6, to be connected, is flared outwardly, as at 7, to engage with the outer inclined face or bevel 3 and connected by solder. By this means no obstruction or shoulder is presented to the flow of the water. Should the flow of water be in the opposite direction, that is, in the direction of the arrow *b*, Fig. 3, the end of the lead pipe 8 is beveled by rasping or filing, as at 9, so that it may be inserted into the nipple 1 to engage the inner inclined face or bevel 4, to which it is connected by solder and by reason of which no obstruction is presented to the path of flow of the fluid.

10 designates a wrench hold for screwing the nipple in position. From the above, it will be understood, that as a new article of manufacture, my nipple is adapted for connection internally or externally with a pipe, without any preparation on the part of the operator, when forming the joint, which is a great advantage over the constructions of which I am aware. By reason of the beveled faces, it will be seen that when using a nipple and pipe of corresponding sizes, the inner bevel permits the insertion of the end of the pipe without varying the size of bore, which would not be possible without the bevel, while the exterior bevel reduces the amount of expansion of the pipe to receive the end of the nipple.

It will now be apparent that I have devised a novel and useful construction of a solder nipple which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. A solder nipple, comprising a body having means on one end for connection with a pipe and having the other end formed with oppositely extending beveled faces, whereby the end is adapted for connection interiorly or exteriorly with a pipe.

2. A solder nipple, comprising a body having one end provided with an external beveled face and an internal beveled face to form an annular edge, located approximately in the median line of the wall of the body.

3. A solder nipple, comprising a body having one end internally and externally tapered, with the tapers extending in opposite directions away from the end to form substantially a relatively thin edge.

FRANKLIN G. HIRST.

Witnesses:
C. D. McVay,
K. M. Brophy.

Copies of this patent may be obtained for five cents each, by addressing the "Commissioner of Patents, Washington, D. C."